US006572377B2

(12) United States Patent
Masters

(10) Patent No.: US 6,572,377 B2
(45) Date of Patent: Jun. 3, 2003

(54) COMPUTERIZED INTERIOR DESIGN EXPERT SYSTEM

(76) Inventor: Cynthia H. Masters, 929 Rutherford Rd., Greenville, SC (US) 29609

( * ) Notice: Subject to any disclaimer, the term of this patent is extended or adjusted under 35 U.S.C. 154(b) by 39 days.

(21) Appl. No.: 09/877,071

(22) Filed: Jun. 8, 2001

(65) Prior Publication Data

US 2002/0006602 A1 Jan. 17, 2002

Related U.S. Application Data

(60) Provisional application No. 60/210,614, filed on Jun. 9, 2000.

(51) Int. Cl.[7] ............................................. G09B 25/00
(52) U.S. Cl. .............................. 434/72; 434/75; 434/79; 434/80
(58) Field of Search ............................... 434/72, 74, 75, 434/76, 79, 80

(56) References Cited

U.S. PATENT DOCUMENTS

| 3,994,079 A | 11/1976 | Mirman ........................ 35/53 |
| 4,148,148 A | 4/1979 | Riehle ......................... 40/594 |
| 4,652,239 A | 3/1987 | Brimberg ..................... 434/80 |
| 4,931,929 A | 6/1990 | Sherman ..................... 364/401 |
| 5,368,485 A | 11/1994 | Phillips ........................ 434/75 |
| 5,499,366 A | * 3/1996 | Rosenberg et al. ...... 707/104.1 |
| 5,574,889 A | * 11/1996 | Jindo et al. .................. 702/196 |
| 5,601,431 A | * 2/1997 | Howard ........................ 434/79 |
| 5,688,125 A | 11/1997 | Birdsong-Raffo ............ 434/72 |
| 5,751,829 A | * 5/1998 | Ringland et al. ............. 355/79 |
| 5,796,395 A | 8/1998 | de Hond ..................... 345/331 |
| 5,825,365 A | 10/1998 | Hirota et al. ................ 345/433 |
| 5,870,771 A | 2/1999 | Oberg ........................ 707/502 |
| 5,894,310 A | 4/1999 | Arsenault et al. ........... 345/433 |
| 5,937,081 A | 8/1999 | O'Brill et al. .............. 382/111 |
| 5,966,310 A | 10/1999 | Maeda et al. ................ 364/512 |
| 5,966,454 A | 10/1999 | Thomas et al. ............. 382/111 |
| 5,975,908 A | 11/1999 | Hulten ......................... 434/72 |
| 6,005,969 A | 12/1999 | Thomas et al. ............. 382/162 |
| 2002/0002497 A1 | * 1/2002 | Tilman ........................ 705/26 |
| 2002/0010522 A1 | * 1/2002 | Martin ........................ 700/97 |
| 2002/0030689 A1 | * 3/2002 | Eichel et al. ............... 345/588 |

* cited by examiner

*Primary Examiner*—John Edmund Rovnak
(74) *Attorney, Agent, or Firm*—McNair Law Firm, P.A.; Douglas W. Kim

(57) ABSTRACT

This invention is a computerized expert system for providing interior design by allowing a homeowner to enter interior design requirements and selecting interior design treatments according to the homeowner's design requirements so that a grouping of compatible interior design treatments is provided for the homeowner to be used in decorating the homeowner's home.

19 Claims, 7 Drawing Sheets

COMPUTERIZED INTERIOR DESIGN EXPERT SYSTEM

This application claims benefit of Provisional Application 60/210,614, filed Jun. 9, 2000.

FIELD OF THE INVENTION

This invention relates to a computerized interior design expert, and more particularly, to an interior design system allowing a homeowner to access a computerized expert system for entering desired interior design requirements and being presented with compatible interior design treatments such as fabrics, wall coverings, floor coverings, window treatments, paint colors, and ceiling colors to be used with the interior design of a home.

BACKGROUND OF THE INVENTION

With today's economy and the increase in both new and existing home sales, there has been a surge in the desire for homeowners to decorate the interior of their homes. Traditionally, this is achieved by hiring an interior designer who is a consultant for the interior design and decoration of a home. The role of the interior designer is to assist the homeowner deciding the homeowner's design requirements such as color and style. These design requirements are used to select interior design treatments such as fabrics for furniture and window treatments, fabrics, wall coverings such as floor cover and wallpaper, paint colors for floors, walls, trim, and the ceiling. Traditionally, the selection process involves the homeowner and the interior designer meeting personally, reviewing the existing coloring, reviewing the existing furniture, and discussing the "style" or "feel" that the homeowner wishes for the home. Interior designers typically charge by the hour for this service with rates in excess of $100 per hour. The time required to decorate an individual room can drive the interior design consulting fee into the thousands of dollars. Therefore, the services of an interior designer have been typically limited to only those individuals with sufficient income to afford an interior designer. Providing an interior design expert system that provides the services of a human interior designer, including color palette selection, space planning, and fabric selections but does not require the full-time, one-on-one interaction with the interior designer is a problem to which considerable attention should be given. Attempts in the past to address this problem have been unable to provide an integrated system to assist a homeowner in designing their homes with interior design treatments that conform to the homeowner's design wishes.

For example, U.S. Pat. No. 4,652,239 is directed to a space planning system having flexible cast coated paper substrates which electrostatically adhere to a coated surface allowing an individual to have a plan view of a room. The view includes walls, windows, furniture, appliances, plants, and the like. However, this invention does not provide any means in which to select fabrics, colors, wall coverings, or other interior design treatments. U.S. Pat. No. 3,994,079 is directed to a display device suitable for interior designs having a baseboard, one or more background replicas, and shapes and designs that fit under the baseboard with magnetically attached articles to assist with space planning. This invention also allows different fabrics to be placed upon individual pieces of furniture but contains no ability to validate selections nor to assist with the selection of interior design treatments. Neither provide an expert system for providing interior design treatments compatible with the homeowner's design requirements.

Accordingly, it is an object of this invention to provide for a computerized expert system to assist in selecting interior design treatments compatible with the homeowner's design requirements.

Another object of this invention is to provide an expert interior design system having the ability to validate selected interior design treatments to ensure that the final interior design plan is integrated, consistent, aesthetically pleasing, and compatible with the homeowner's design wishes.

Another object of this invention is to provide for an expert interior design system for selecting interior design treatments such as color palettes, paint, fabrics, wall coverings, and floor coverings through a computerized expert system, thereby reducing or eliminating the time and expense associated with an expensive interior designer.

SUMMARY OF THE INVENTION

The above objectives are accomplished according to the present invention by a computerized expert system for providing interior design by selecting interior design treatments in accordance with a homeowner's interior design wishes comprising, a computer processor, a computer readable medium in electronic communication with the processor, a database in electronic communication with the processor containing data representing individual interior design treatments selectable by selection criteria, an input device in communication with the processor for inputting a homeowner's design requirements, a output device in communication with the processor for providing output to the homeowner, and a set of computer readable instructions embodied within the computer readable medium controlling the processor for receiving the design requirements from the input device, selecting a set of interior design treatments by selection criteria in accordance with the design requirements, and outputting the set to the homeowner so that the homeowner is provided the available interior design treatments according to the homeowner's design requirements.

The system can also include computer readable instructions for organizing the set of interior design treatments in a hierarchy in accordance with the design requirements so that the most desired treatments are displayed higher in said hierarchy. Additionally, the instructions can limit the interior design treatments provided to those above a predetermined level in the hierarchy.

To provide a grouping or plurality of interior design treatments, the system can include instructions for selecting a first interior design treatment from the set of interior design treatments, selecting an additional interior design treatment from the set of interior design treatments distinct from the interior design treatments already selected, comparing the selection criteria of the first interior design treatment with the selection criteria of the selected additional interior design treatment, and providing a grouping of the first and the additional interior design treatment only if the selection criteria of the first and the additional interior design treatments are compatible so that the homeowner is provided with a plurality of compatible interior design treatments in accordance with the homeowner's interior design wishes.

These instructions can be repeated until the resulting grouping contains a predetermined number of interior design treatments so that the homeowner is provided a plurality of compatible treatments in accordance with the homeowner's design requirements.

As part of the homeowner's design requirements, a color requirement can be part of the design requirements and a color selection criteria can be part of the selection criteria. Also, a pattern selection criteria can be included within the selection criteria, as well as a style selection criteria.

This invention is not limited to computer instructions and can have means for storing data representing individual interior design treatments selectable by selection criteria, means for receiving a homeowner's design requirement, means for selecting a set of interior design treatments, selected by the selection criteria, from the stored data in accordance with the design requirements, and means for outputting the set of selected interior design criteria so that the homeowner is provided the available interior design treatments according to the homeowner's interior design wishes.

The invention can include means for organizing the set of interior design treatments in a hierarchy in accordance with the design requirements so that the most desired treatments are displayed higher in the hierarchy. There can also be means for limiting the interior design treatments provided to those of a predetermined level in the hierarchy.

To provide a grouping, this invention can include means for selecting a first interior design treatment from the set of interior design treatments, means for selecting an additional interior design treatment from the set of interior design treatments, means for comparing the selection criteria of the first interior design treatment with the selection criteria of the selected additional interior design treatment, and means for providing a grouping of the selected additional interior design treatments only if the selection criteria of the selected interior design treatments are compatible so that the homeowner is provided with a plurality of compatible interior design treatments in accordance with the homeowner's interior design wishes. Means for selecting a predetermined number of additional interior design treatments from the set of interior design treatments distinct from the interior design treatments already selected an also be included.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

The detailed description which follows may be presented in terms of programming procedures modules or objects which are executed on a computer or a network of computers and are contained in a set of computer readable instructions. These procedural, modular, and object descriptions and representations are the means by which those skilled in the art must effectively convey the substance of their work to others skilled in the art. A procedure, object, module, or set of instructions as herein described, is generally a self-consistent sequence of steps leading to a desired result. These steps are those requiring physical manipulations of physical quantities. Usually, these quantities take the steps of electrical or magnetic signals capable of being stored, transferred, combined, compared, or otherwise manipulated within a computer readable medium. More specifically, a procedure, object, or module is a section of computer readable code which is designated to perform a specific task or tasks. The actual computer executable code may not be contained with one file or storage medium in order to constitute a procedure, object, or module. Procedures, objects, or modules may receive information (input) passed by another calling procedure, object, or module and may transmit information (output) to the calling procedure. The host is computer hardware capable of creating and processing computer readable instructions and it is not limited to a single computer. For example, storage medium, network communications, and main processing could be executed by three physically separate computers and would still constitute a host. Therefore, the term "host" is not intended to be limited to a single computer. With these terms in mind, the preferred embodiment is described.

Figure 1:
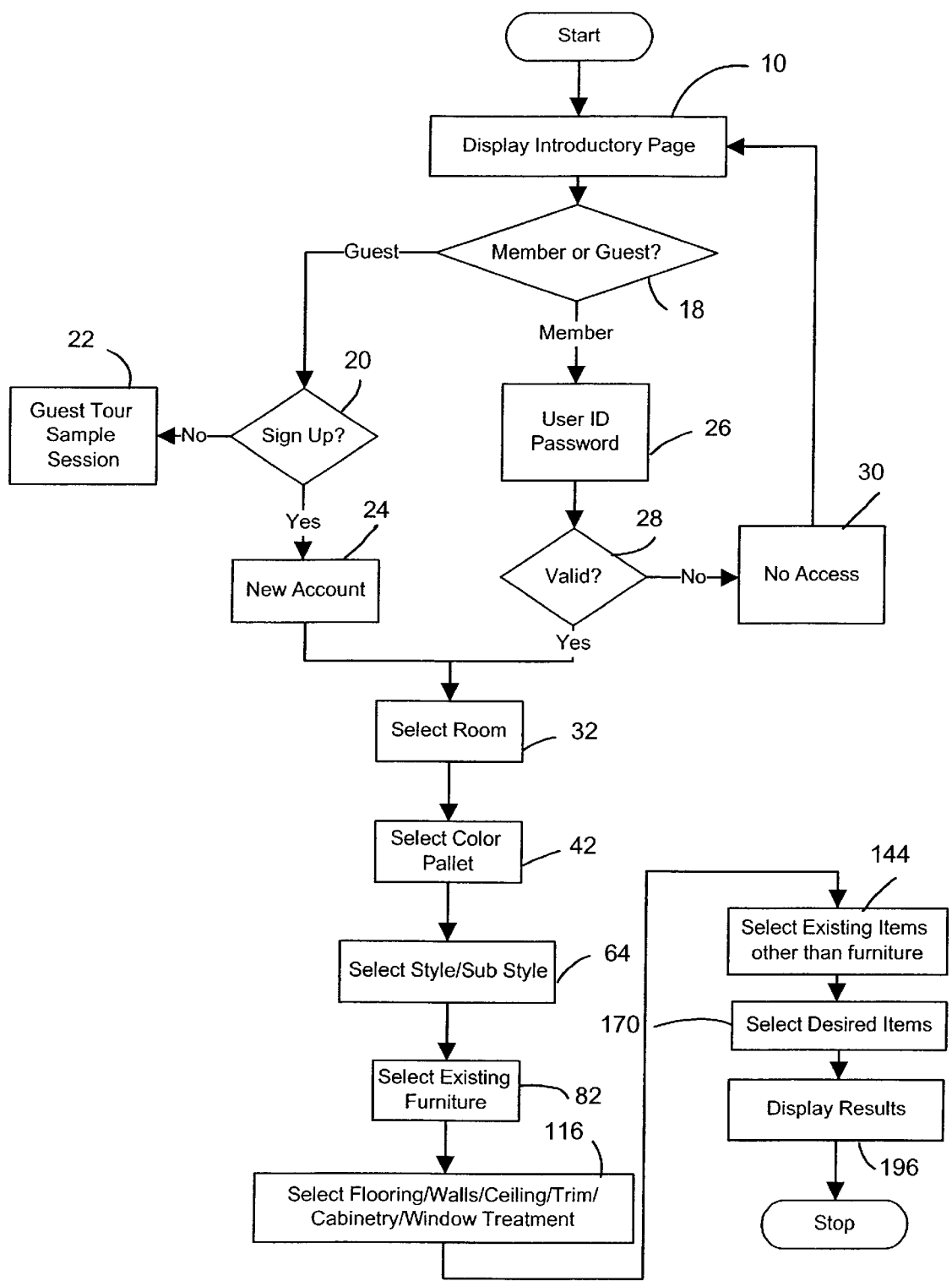
FIG. 1 is a flowchart showing the operation of the invention.

Referring to the drawings, the invention will now be described in more detail. This invention provides an expert interior design system contained in computer readable instructions. These computer readable instructions are executed on a computer having a computer processor and computer readable medium. The computer readable medium stores the computer instructions and executes these instructions. Referring now to FIG. 1, a homeowner wishing to use this system executes the computer program either locally or over a network. Upon initial execution, an introductory page is displayed in step 10. The expert system can be a stand-alone system where the homeowner is directly accessing the executing computer or the executing computer an be a host connected to a wide area network so that homeowner accesses the host computer through a terminal connected through a network. This configuration can allow access to the program through a web browser or similar interface. The network could be a local area network, wide area network, or the World Wide Web (Internet).

After receiving the introductory page in step 10 the system asks if the homeowner is a member or guest of the system in step 18. If the homeowner selects guest, the homeowner is asked if he would like to sign-up as a member of the system in step 20. If the homeowner declines the offer, the homeowner is given the opportunity to participate in a guest tour in step 22. The guest tour is a sample interior design session illustrating form, features, and function of this system. In the event the homeowner wishes to become a member, the homeowner provides the necessary information and may provide payment information in order to establish a new account in step 24. At step 18, if the homeowner is already a member, the homeowner may enter information such as user ID and password in step 26. The user ID and password are validated in step 28 and if either element is invalid, access is denied in step 30 and the homeowner is taken back to the introductory page of step 10.

Figure 2:
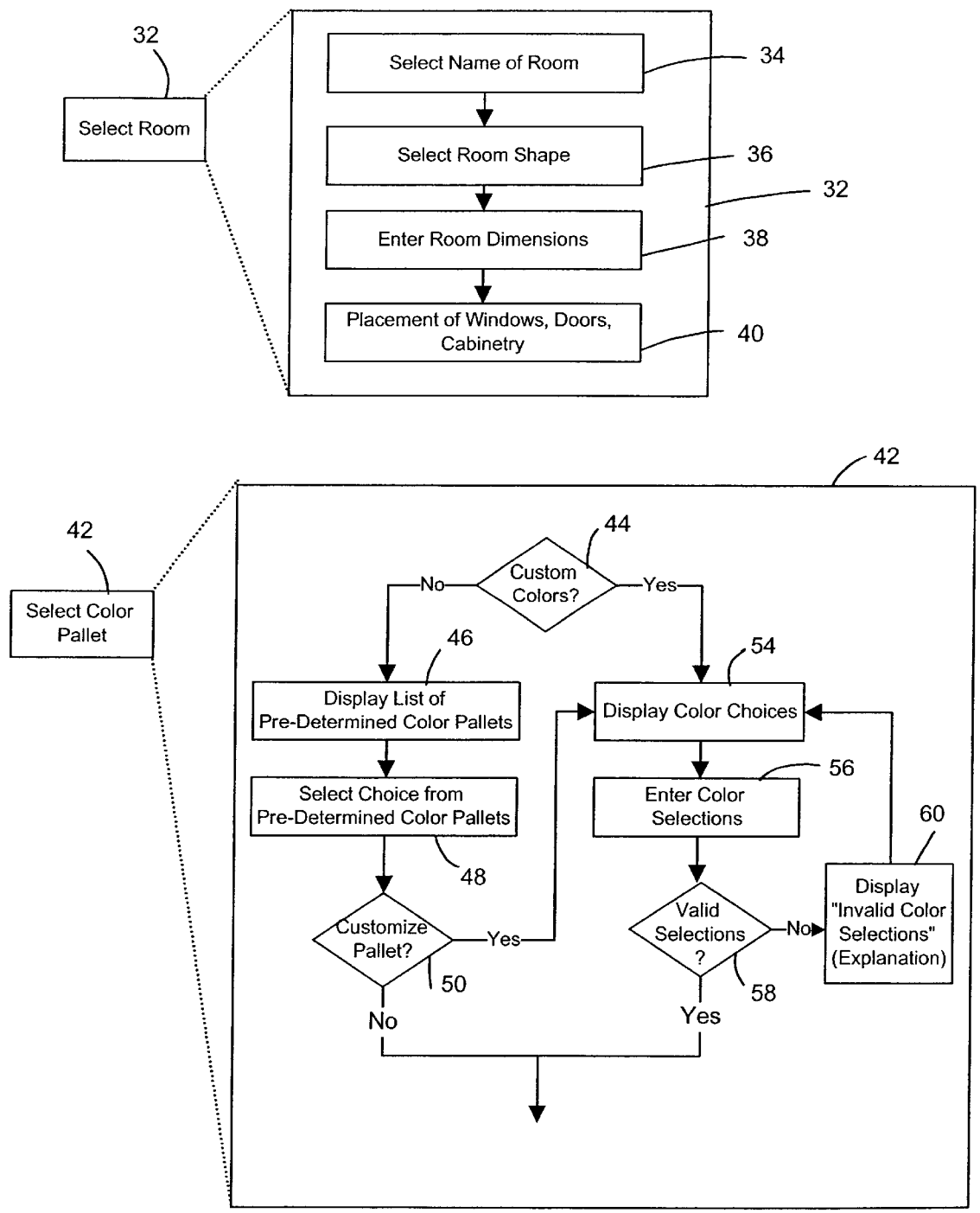
FIG. 2 is a flowchart showing the select room and select color palette modules of the invention.

If the homeowner is an existing member or otherwise has access, the homeowner can then select the room which will be the subject of the interior design session in step 32. The design session can be for one room, the entire house, or several rooms done linearly Referring now to FIG. 2, step 32 is explained in more detail. The first step in selecting a room is to select the name of the room in step 34. The next step is to select the room shape by either selecting predetermined shapes or entering the perimeter of the room into the computer program. Several methods of providing such input include entering starting and stopping points for walls, using drag and drop walls, selecting preexisting shapes and overlays so that the outer perimeter of the conglomerate shape represents the shape of the room, or entering through a coordinate system the location of the walls. Once the perimeter of the room has been entered, the homeowner then enters the room dimensions in step 38 so that the computer program knows the length of each wall to facilitate space planning. Once the room shape and dimension have been entered into the system, the homeowner then places windows, doors, and cabinetry in step 40 and adds the dimensions to these elements.

Once the room information has been entered, the homeowner enters design requirements such as a desired color palette in step 42. The purpose of the color palette is to inform the system of a color scheme according to the homeowner's wishes and which are included in the design requirements. This allows the selected interior design treatments, such as paint color, fabrics, wall coverings, floor coverings, and trim color to be consistent with the color palette and, therefore, the homeowner's design requirements. When selecting the color palette, the homeowner is given the option in step 44 to either pick a color palette from a predetermined list or to create a color palette from scratch. If the homeowner decides to select a palette from a predefined list, the list is displayed at step 46 so that the homeowner can see the possible color options. Once the homeowner reviews the list of predetermined color palettes, the homeowner enters the selection in step 48. In step 50, the homeowner is given the option to customize any of the colors in the palette. If the homeowner accepts the offer to customize the palette the homeowner is taken to step 54 which displays all the available colors for selection by the homeowner. This display is the same display had the homeowner accepted the invitation to select custom colors in step 44. Once the colors are displayed, the homeowner can either select colors for replacing a color of the existing palette or add colors to a palette which has yet been completed in step 56.

It should be noted that during this selection process where the homeowner is primarily entering information about the existing room, the session information is stored in session database 62 (FIG. 8) so that the homeowner is able to end a session mid-stream, and return to the session later without losing any of the previous input. The session information can be associated with the homeowner's user ID so that the session can be later identified. Once the color palette portion of the design requirements have been selected, the homeowner may then selects a style.

Figure 3:
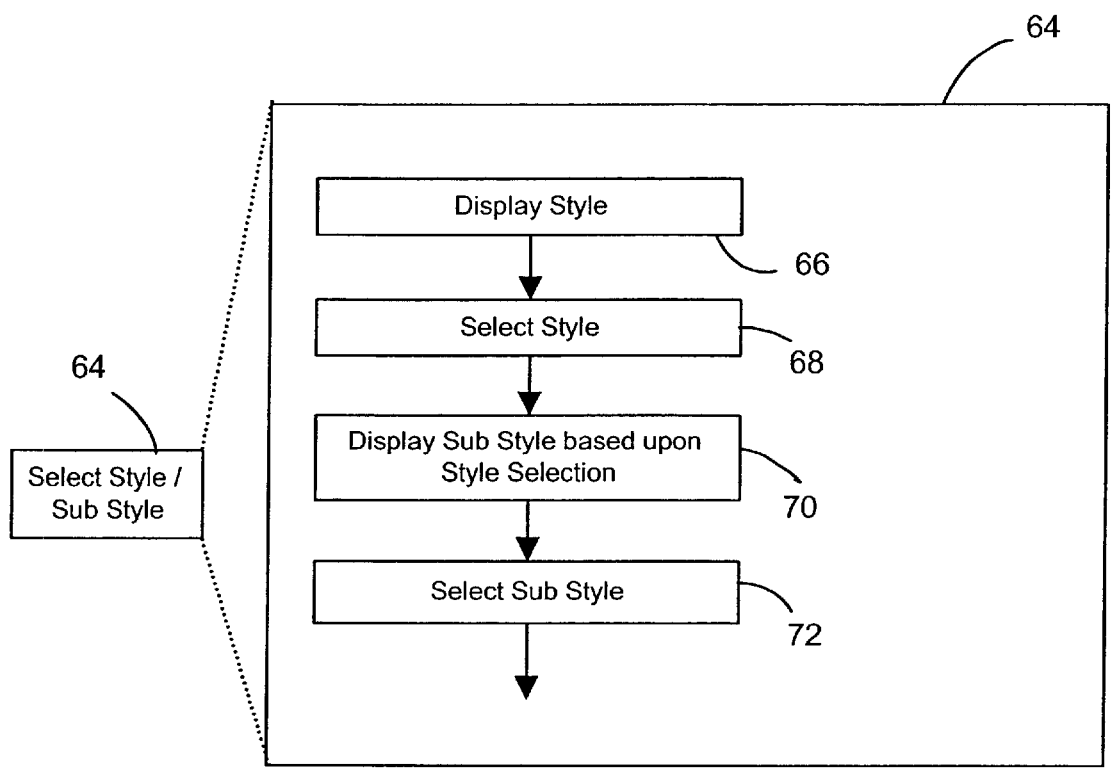
FIG. 3 is a flowchart of the select style and sub-style modules of the invention.

Referring to FIG. 3, the additional design requirements of style and sub-style may be selected at step 64. Step 66 provides the homeowner with a list of the predetermined styles from which the homeowner may select. After reviewing the list, the homeowner selects a style in step 68 which the homeowner wishes to include in the design requirements. Based upon the style selected, a sub-style list is displayed in step 70. Examples of a style would be "traditional" while examples of a sub-style would be "formal". After viewing the list of sub-styles, the homeowner will select a sub-style and provide this input to the system in step 72.

Figure 4:
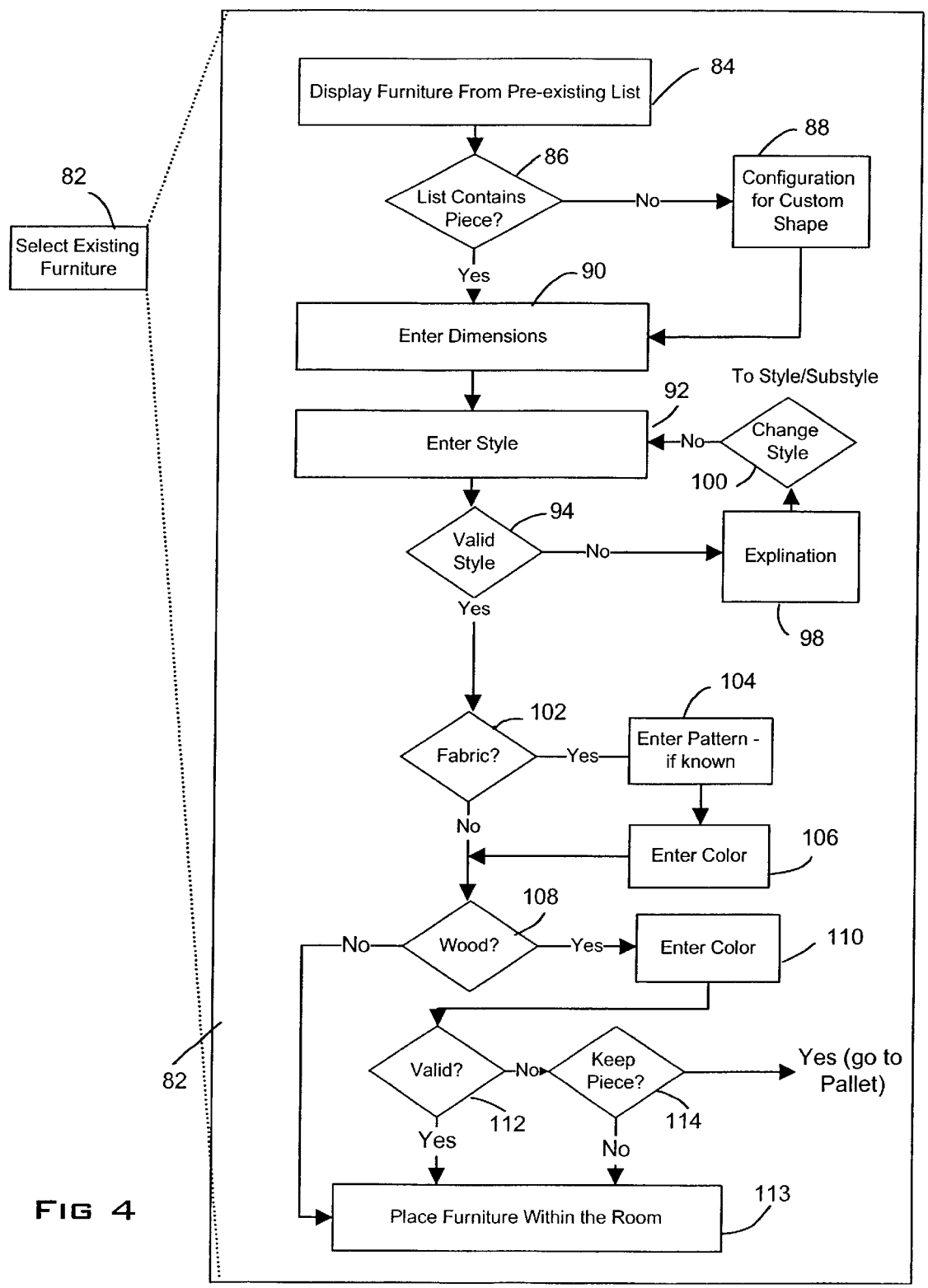
FIG. 4 is a flowchart the select existing treatment module of the invention.

Referring now to FIG. 4, the homeowner may wish to utilize any existing treatments such as furniture, wall coverings, floor coverings, and window treatments in the room and have the expert system consider these existing treatments when suggesting the interior design treatments. For example, a homeowner may have already purchased a sofa and wishes to include the characteristics of the existing sofa with the design requirements. Therefore, the interior design treatments provided to the homeowner are compatible with the design requirements including the existing sofa. The same would be true for existing window treatments, curtains, paint, floor coverings, or wall coverings. The characteristics of these potentially existing treatments include color, style, and pattern.

The selection of existing treatments at step 82 is described in further detail. In selecting existing furniture, the first step is to provide the homeowner with a list of preexisting furniture available from a database in step 84. In step 86, the homeowner decides whether the piece the homeowner wishes to keep is in the existing list or not. If the piece is not in the existing list, then the homeowner is given the ability to enter a custom shape in step 88 that most closely resembles the size and shape of the existing furniture. Once the furniture selection is made the dimensions of the piece are entered in step 90. After entering the dimensions of the piece, the homeowner begins to enter furniture characteristics such as style in step 92. The style is then validated in step 94 by comparing the style of the existing furniture with the style selected as part of the homeowner's design requirements. If the styles are compatible, the homeowner can enter additional characteristics such as fabric or finish for the existing furniture. If the styles are not compatible, the homeowner is taken to an explanation of the incompatibility in step 98 and given the opportunity to change the style of the design requirements in step 100. If the homeowner accepts the invitation to change the design requirements, the homeowner is taken to step 66 to select a new style for the design requirements. In step 102, the homeowner is prompted as to whether the existing piece of furniture contains fabric. If the piece of furniture does contain fabric, the homeowner is prompted to enter fabric characteristics such as pattern in step 104 and color in step 106. If the homeowner wishes to re-upholster the existing furniture, the pattern and fabric are not entered. The homeowner is now taken to step 108 where the homeowner is asked about the presence of wood on the existing furniture. If the homeowner wishes to enter fabric criteria such as the color of the finish, then the color is entered in step 110. If a color is entered, the color is then compared with the design requirements and previously selected existing treatments and checked for compatibility at step 112. If the color is compatible, the homeowner continues to the next step. If the color is not compatible, the homeowner is prompted in step 114 to whether the homeowner wishes to keep the existing furniture or not. If the homeowner does not wish to keep the existing treatment, then the piece is deleted from the existing session and the homeowner proceeds to the next step. If the homeowner wishes to keep the existing treatment, then the homeowner is invited to change the design requirements to one which is compatible with the characteristics of the existing treatment. After the design requirements have been changed the homeowner is returned to step 82 in order to select the next existing treatment. After the information for existing furniture is selected, the furniture is placed in the room by the homeowner in step 113. Once all of the pieces of furniture in which the homeowner wishes to keep are selected, the homeowner is taken to step 116 (FIG. 1).

Figure 5:
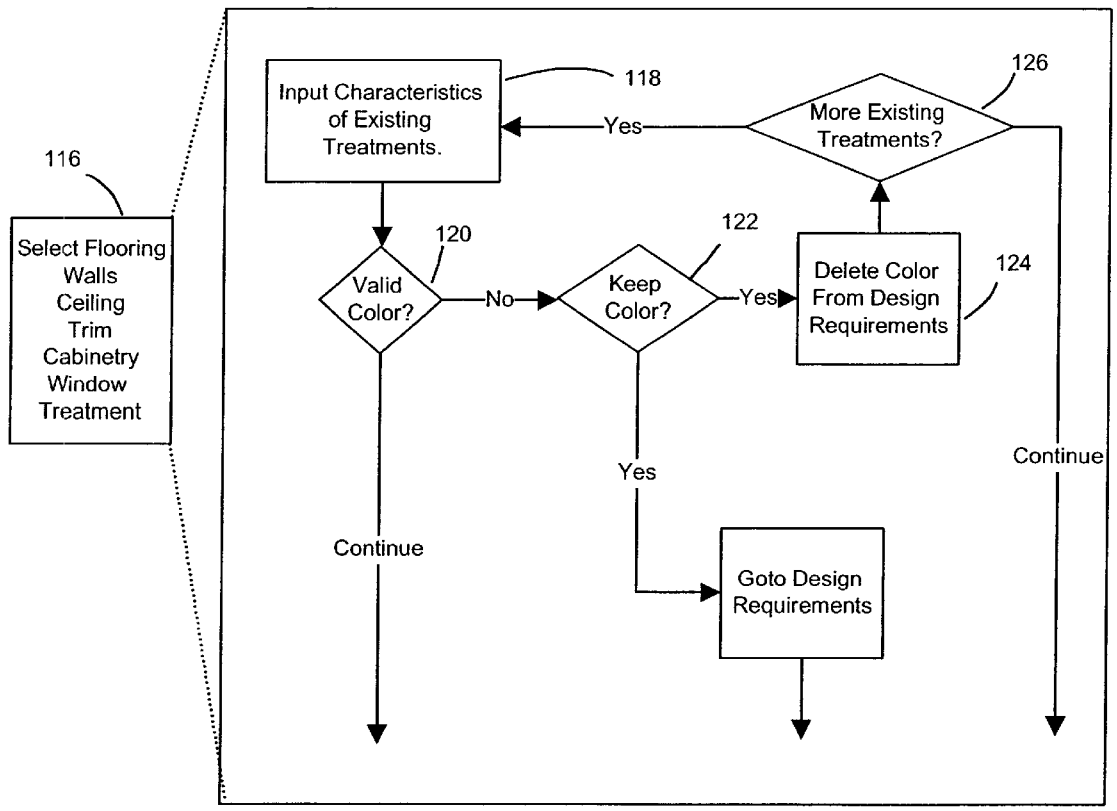
FIG. 5 is a flowchart showing the select additional existing treatment module for the invention.

Step 116 prompts the homeowner to select additional existing treatments such as floor coverings, wall coverings, ceiling coverings or paint, trim, wainscoting, cabinetry, and window treatments as further illustrated in FIG. 5. In step 118 the homeowner inputs the characteristics of the existing treatment such as color and style. If color was inputted, the color selected for the flooring is validated in step 120 and, if the color is not compatible with the design requirements, the homeowner is prompted as to whether to keep the particular color in step 122. If the homeowner does not wish to keep the color, then the color is deleted from the design requirements at step 124 and the homeowner is taken to step 116 to select additional existing treatments if none exist at step 126. If the homeowner wishes to keep the color in step 122, the homeowner is prompted to go to the design requirements of step 42 and may edit the design requirements so that the design requirements and the existing treatment characteristics are compatible.

In comparing the design requirements, interior design selection criteria and existing treatments characteristics, several comparison methods are embodied in the set of computer readable instructions. The design requirements can include color which is numerically represented in the computer readable medium. A color contains values representing Red (R), Green (G), and Blue (B) of each color of an interior design treatment. Additionally, the colors can be represented in Lightness (L), Red to Green (A), and Blue to Yellow(B). L represents lightness or darkness, A represents the range from red to green, and B represents the range from blue to yellow. Any number of methods can be used to numerically represent color, but R G B will be used to explain this invention. Regardless of the color model, these values are included with the selection criteria of each treatment. Included in the design requirements are a palette of colors to be inputted by the homeowner with each color also having a numeric value. By way of example, the first color inputted for the design requirements can be designated $R_{c1}$ which would be a set of values representing color or $\{R_{R1}, G_{R1}, B_{R1}\}$. The design requirements can have $R_{C1}$, $R_{C2}, \ldots R_{CN}$ colors.

Additionally, the selection criteria of each available interior design requirement can include color of the interior design treatment represented by $T_{C1}$, which is also a set of color values or $\{R_{T1}, G_{T1}, B_{T1}\}$. An interior design treatment, therefore, would have $T_{C1}, T_{C2}, \ldots T_{CN}$ colors.

When the system is selecting the set of available interior design treatment according to the design requirements, the computer readable instructions compare the color values of the design requirements with the color values of the interior design treatment and if the colors of the interior design treatment fall within a predetermined range of the color of the design requirement, the interior design treatment is included in the set. Therefore, when the system is searching the database of available interior design treatments, the system takes the first color of the design requirements and selects all the available interior design treatments. If a color of the interior design is within a specific tolerance or match factor of the color of the design requirement the interior design treatment is selected. The system would select an interior design treatment if:

$$\{R_{RI} - \alpha_R \langle R_{TI} \langle R_{RI} + \beta_{RI} \rangle\}$$

$$\{G_{RI} - \alpha_G \langle G_{TI} \langle G_{RI} + \beta_{GI} \rangle\}$$

$$\{B_{RI} - \alpha_B \langle B_{TI} \langle B_{RI} + \beta_{BI} \rangle\}$$

If an interior design treatment is compatible based upon the above selection, the system checks the remaining colors of the interior design treatment with the remaining colors of the design requirements. If any color of the interior design treatment is incompatible with any color of the palette, then the interior design treatment will not be included within the set of available interior design treatments. A color is incompatible if it falls outside a certain tolerance or match factor of the design requirements. For example, an interior design treatment would not be selected if the third color of the treatment was incompatible with the second color of the design requirements, or $$\{R_{T3} \langle R_{R2} - \theta_R \text{ or } R_{T3} \rangle R_{R2} + \Omega_R\}$$

$$\{G_{T3} \langle G_{R2} - \theta_G \text{ or } G_{T3} \rangle G_{R2} + \Omega_G\}$$

$$\{B_{T3} \langle B_{R2} - \theta_B \text{ or } B_{T3} \rangle B_{R2} + \Omega_B\}$$

Therefore, only interior design treatments compatible with all the design requirements are included in a set of compatible interior design treatments. Based upon the comparison of color values of the interior design treatments and design requirements, the interior design treatments of the set can be placed in a hierarchy with those most compatible placed higher in the hierarchy. The closer the colors of the interior design treatment to the colors of the design requirements and the greater the number of compatible colors, the higher in the hierarchy the interior design treatment would appear.

Patterns can also be included in the selection criteria of the interior design treatment. Specified compatibility rules are included in the system and are used to select interior design treatments and to provide groupings of interior design treatments that are compatible. For example, when the system provides a plurality of interior design treatments for a grouping, the system would not place a large floral with a small floral, stripes with checks or with plaids, large stripes with small stripes, and other exclusion criteria common in the interior design industry. Simply, some patterns are just not compatible with others. The same analysis holds true for styles. However, the design requirements can also include style and each interior design treatment can include style in the selection criteria. If the style of the design requirements is oriental, then an interior design treatment with an associated style of southern tradition would not be compatible. Style compatibilities are known to the interior design industries. Based upon these known incompatibilities, an interior design treatment may be excluded if the style of the selection criteria for that interior design treatment is incompatible with the design requirement or with another interior design treatment of the grouping.

Figure 6:
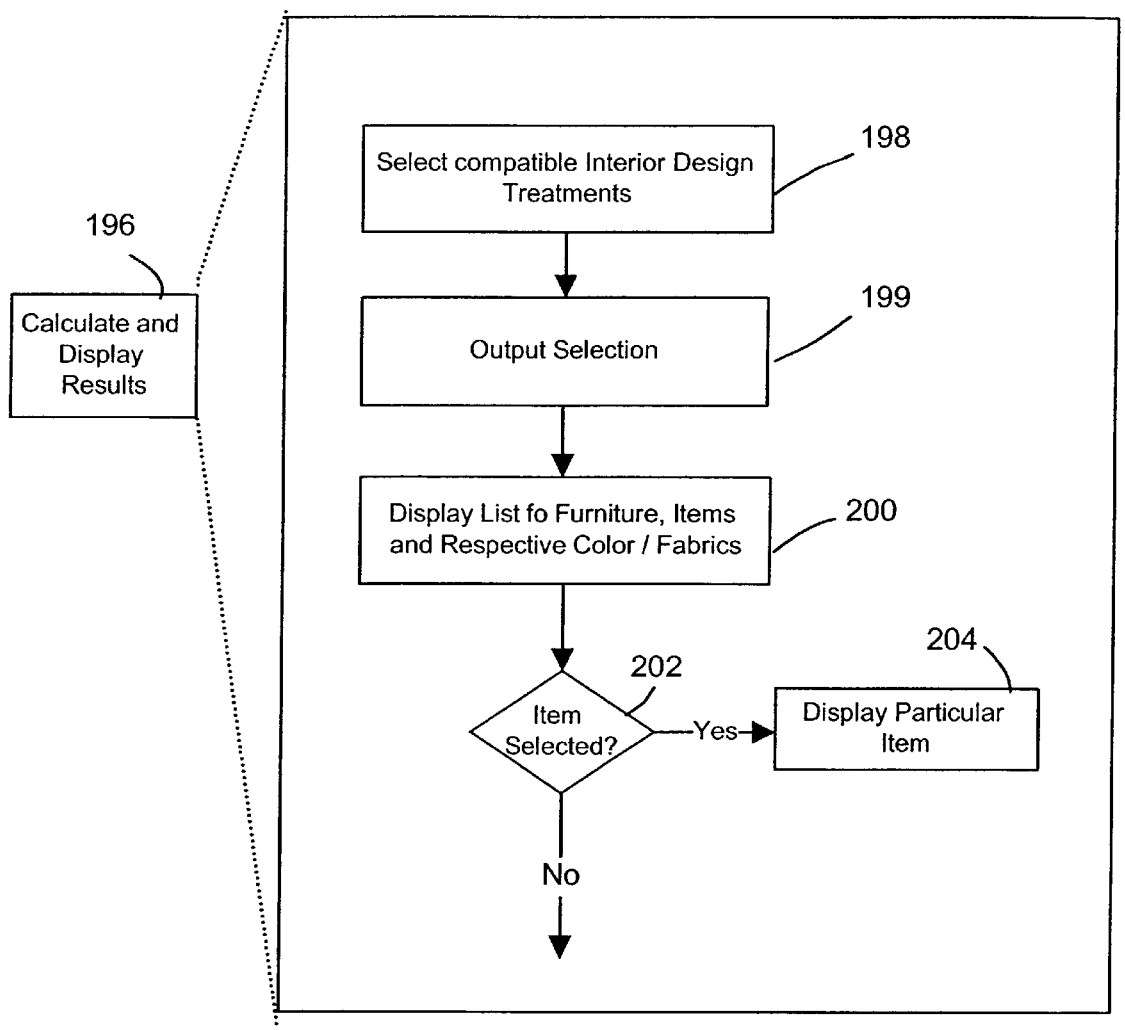
FIG. 6 is a flowchart showing the display of the calculated results.

Referring now to FIG. 6, the output of the compatible interior design treatments is described in more detail. Step 198 performs the analysis for compatibility according to color, pattern, or style of the design requirements and existing treatments. In step 199 the compatible treatments or groupings are provided to the homeowner so that one of the groups to be used in the interior design of the home can be shown. Step 202 allows the homeowner to view a particular item with a compatible interior design treatment and have the treatment overlaid on the item and displayed in step 204.

Figure 7:
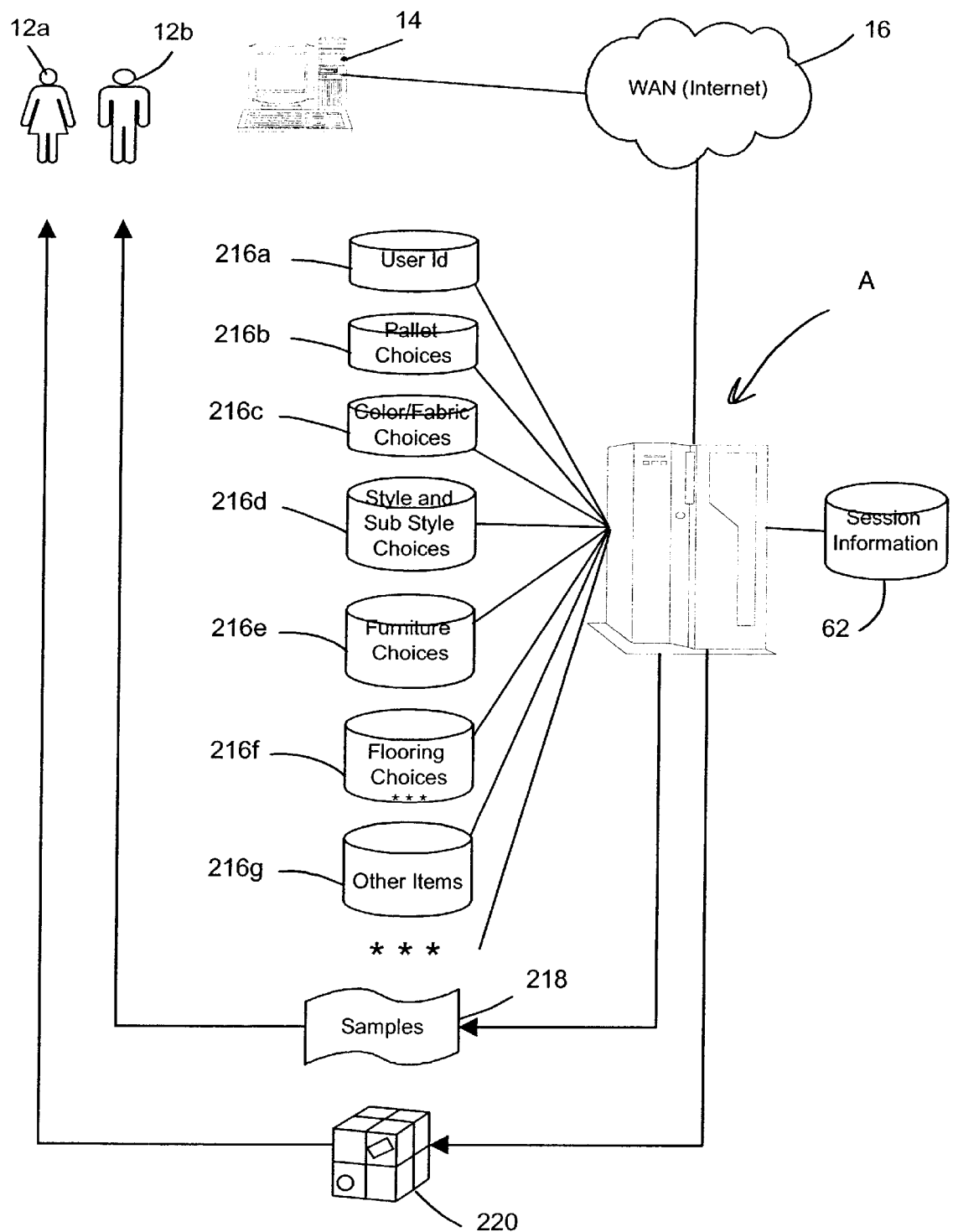
FIG. 7 is a diagram showing the various data and data flow of the invention.

Referring now to FIG. 7, it can be seen that homeowners 12a and 12b can access this system through terminal 14 and have their session information saved in a database 62. The user IDs of the homeowners are in the database 216a so that when the homeowners log into the system they can be associated with any potential saved session information in database 62. Computer A also contains tables or databases of the color choices in 216b, fabric choices in 216c, style in 216d, existing furniture in 216e, flooring choices in 216f, and other existing treatments in 216g. Samples 218 of selected interior design treatments or groupings can be sent to the homeowner in physical form. After reviewing samples 218, homeowners 12a and 12b can enter in order information and have the interior design treatments recommended for this system and represented by 220 shipped directly to the homeowners.

While a preferred embodiment of the invention has been described using specific terms, such description is for illustrative purposes only, and it is to be understood that changes and variations may be made without departing from the spirit or scope of the following claims.

What is claimed is:

1. A computerized system for providing interior design for selecting interior design treatments in accordance with a homeowner's interior design wishes comprising:

a computer processor;

a computer readable medium in electronic communication with said processor;

a database in electronic communication with said processor containing data representing individual interior design treatments selectable by selection criteria;

an input device in communication with said processor for inputting a homeowner's design requirements;

a output device in communication with said processor for providing output to the homeowner; and, a set of computer readable instructions embodied within said computer readable medium controlling said processor for receiving the design requirements from said input device, selecting a set of interior design treatments by selection criteria in accordance with said design requirements, selecting at least one grouping of design treatments from said set of interior design treatments that is internally compatible within said at least one grouping, and outputting said at least one grouping to the homeowner so that the homeowner is provided the available interior design treatments according to the homeowner's interior design wishes.

2. The system of claim 1 wherein said set of computer readable instructions includes instructions for providing a plurality of groupings and organizing said plurality of groupings in a hierarchy in accordance with said design requirements so that the most desired treatments are displayed higher in said hierarchy.

3. The system of claim 2 wherein said set of computer readable instructions includes instructions for limiting the interior design treatments provided to those above a predetermined level in said hierarchy.

4. The system of claim 1 wherein said set of computer readable instructions includes instructions for receiving existing treatment characteristics, selecting said set of interior design treatments by selection criteria in accordance with said existing treatments characteristics.

5. The system of claim 4 wherein said set of computer readable instructions includes instructions for providing a plurality of groupings and organizing said plurality of groupings in a hierarchy in accordance with said design requirements so that the most desired treatments are displayed higher in said hierarchy.

6. The system of claim 1 including:

a color requirement included within said homeowner's design requirements; and a color selection criteria included within said selection criteria of said data representing said interior design treatments.

7. The system of claim 6 wherein said set of computer readable instructions includes instructions for comparing said color requirement of said homeowner's design requirement with said color selection criteria of said interior design treatment selection criteria and providing said at least one grouping wherein said color selection criteria is within a predetermined tolerance of said color requirement.

8. The system of claim 6 wherein said set of computer readable instructions includes instructions for excluding said interior design treatments said at least one grouping wherein said selection criteria is outside a predetermined tolerance of said color requirement.

9. The system of claim 1 including a pattern selection criteria included within said selection criteria of said data representing said interior design treatments.

10. The system of claim 1 including a style selection criteria included within said selection criteria of said data representing said interior design treatments.

11. A computerized system having a processor and a computer readable medium for providing interior design for selecting interior design treatments in accordance with a homeowner's design requirements comprising:

means for storing data representing individual interior design treatments selectable by selection criteria;

means for receiving a homeowner's design requirements;

means for selecting a set of interior design treatments, selected by said selection criteria, from said stored data in accordance with said design requirements;

means for selecting at least one grouping of design treatments from said set of interior design treatments that are internally compatible; and, means for outputting said at least one grouping so that the homeowner is provided the available interior design treatments according to the homeowner's interior design wishes.

12. The system of claim 11 including:

means for receiving existing treatment characteristics; and, means for selecting a set of interior design treatments, selected by said selection criteria, from said stored data in accordance with said existing treatment characteristics.

13. The system of claim 11 including means for providing a plurality of groupings and for organizing said plurality of groupings in a hierarchy in accordance with said design requirements so that the most desired treatments are displayed higher in said hierarchy.

14. The system of claim 11 including means for limiting the interior design treatments provided to those of a predetermined level in said hierarchy.

15. The system of claim 11 including:

a color requirement included within said homeowner's design requirements; and, a color selection criteria included within said selection criteria of said data representing said interior design treatments.

16. The system of claim 11 including a pattern selection criteria included within said selected criteria of said data representing said interior design treatments.

17. The system of claim 11 including a style selection criteria included within said selection criteria of said data representing said interior design treatments.

18. The system of claim 15 including means for comparing said color requirements of said homeowner's design requirement with said color sealed criteria of said interior design treatment and selecting said interior design treatments wherein said color selection criteria is within a predetermined tolerance of said color requirement.

19. The system of claim 15 including means for excluding said interior design treatments from said at least one grouping wherein said color selection criteria is outside a predetermined tolerance of said color requirement.

* * * * *